US012786129B2

(12) United States Patent
Leung et al.

(10) Patent No.: US 12,786,129 B2
(45) Date of Patent: Nov. 3, 2026

(54) METHODS AND SYSTEMS FOR ENHANCING THE PERFORMANCE OF CONNECTION AT AN APPARATUS

(71) Applicant: Pismo Labs Technology Limited, Kowloon (HK)

(72) Inventors: Wan Chun Leung, Kowloon (HK); Alex Wing Hong Chan, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 114 days.

(21) Appl. No.: 18/890,746

(22) Filed: Sep. 19, 2024

(65) Prior Publication Data

US 2026/0081872 A1 Mar. 19, 2026

(51) Int. Cl.

| | |
|---|---|
| ***G06F 15/173*** | (2006.01) |
| ***H04L 47/129*** | (2022.01) |
| ***H04L 47/193*** | (2022.01) |
| ***H04L 47/20*** | (2022.01) |

(52) U.S. Cl.

CPC .......... *H04L 47/193* (2013.01); *H04L 47/129* (2022.05); *H04L 47/20* (2013.01)

(58) Field of Classification Search

CPC ....... H04L 47/10; H04L 47/20; H04L 47/129; H04L 47/193; H04W 28/0273; H04W 76/12

See application file for complete search history.

(56) References Cited

U.S. PATENT DOCUMENTS

| | | | | |
|---|---|---|---|---|
| 9,894,694 | B2 * | 2/2018 | Sung | H04W 76/12 |
| 2012/0163167 | A1 * | 6/2012 | Dade | H04W 28/0273 370/229 |
| 2023/0379258 | A1 * | 11/2023 | Zacks | H04L 47/10 |

OTHER PUBLICATIONS

J. Border, M. Kojo, J. Griner, G. Montenegro, and Z. Shelby, "Performance Enhancing Proxies Intended to Mitigate Link-Related Degradations," RFC 3135, Jun. 2001 [RFC3135].

* cited by examiner

*Primary Examiner* — Yves Dalencourt
(74) *Attorney, Agent, or Firm* — Hershkovitz & Associates, PLLC; Abe Hershkovitz

(57) ABSTRACT

The present invention discloses a system and method for performing congestion control at an apparatus. The apparatus may establish at least one first connection with a first node and establish a plurality of second connections with a second node. After the at least one first connection and the plurality of second connections are established, the apparatus may transmit data packets to the second node through the plurality of second connections according to an outbound traffic policy when receiving the data packets from the first node through the at least one first connection. If a first criterion is satisfied, the apparatus may establish a plurality of third connections with the second node and transmit data packets to the second node through the plurality of third connections when receiving data packets from the first node through the at least one first connection.

20 Claims, 11 Drawing Sheets

| | | Outbound Traffic Policy | | | | |
|---|---|---|---|---|---|---|
| | | Policy A | Policy B | Policy C | Policy D | Policy E |
| 401 | Data Type | N/A | N/A | FTP | N/A | HTTPS |
| 402 | Source Device | N/A | First node 201 | | N/A | |
| 403 | Destination Device | N/A | Second node 203 | | | Third node |
| 404 | Encryption | N/A | AES 256 | AES 128 | N/A | N/A |
| 405 | Priority | 1 (Lowest) | 5 | 3 | 7 | 9 |
| 406 | Connections | 208a<br>208b<br>208c<br>208d<br>208e<br>208f | 208a<br>208b<br>208c | 208a | 208a<br>208c<br>208e | 208a<br>208b |

Fig. 4

METHODS AND SYSTEMS FOR ENHANCING THE PERFORMANCE OF CONNECTION AT AN APPARATUS

TECHNICAL FIELD

The present disclosure relates generally to data communication over a Transport Control Protocol (TCP) connection. More specifically, the present disclosure relates to congestion control among connections.

BACKGROUND ART

In the field of networking, TCP congestion control operates in two stages: slow start and congestion avoidance. During the slow start stage, TCP identifies a proper value for the congestion window (cwnd), so as to infer the amount of bandwidth available for a connection. Once a baseline for the cwnd has been established, the congestion avoidance stage takes over. The congestion avoidance stage slowly increases the TCP congestion window to use more network capacity, but quickly reduces it when congestion is detected, in order to avoid overloading the network. Nevertheless, as network environments have become more complex over time, TCP congestion control becomes more challenging.

Improving network performance with a single TCP congestion control algorithm is difficult even for a single connection with multiple variations, and even more so for scenarios involving multiple connections. For example, it is hard for a single TCP congestion control algorithm to find the sweet spot for both round-trip time (RTT) and latency when dealing with connections that transition between high-speed, low-latency networks (like Ethernet) and high-latency networks (like Low Earth Orbit (LEO) connection). Those who are skilled in the art may know that a significant RTT is required for LEO connections to transmit data packets between a network device and a satellite's network device. Of course, the LEO connection is an example for illustrative purposes only but the challenge applies broadly to any scenario with a high latency or significant RTT.

Therefore, the present invention discloses a new method for controlling TCP congestion at a network device. The network device may initiate a new connection with a TCP congestion control algorithm that differs from the original one when the network performance deteriorates.

SUMMARY OF THE DISCLOSURE

According to one embodiment of the present invention, if the first criteria is satisfied, the network device may replace a plurality of connections established between the network device and the second node with another plurality of connections, such that a different congestion control algorithm is applied to control the transmission rate of data packets.

Furthermore, after a period of time, the network device may determine whether the alternative plurality of connections satisfies a second criteria. If the second criteria is satisfied, the network device may establish a further plurality of connections and transmit the second data packet to the second node through this further plurality of connection.

According to another embodiment of the present invention, the network device may modify the data packet as a modified data packet, and transmit the modified data packet through the alternative plurality of connections.

According to another embodiment of the present invention, the network device may further aggregate the plurality of connections and the alternative plurality of connections as at least one aggregated connection, such as at least one first aggregated connection and at least one second aggregated connection.

BRIEF DESCRIPTION OF DRAWINGS

FIG. 4 is a table illustrating how different outbound traffic policies are applied to the network device according to the embodiments of the present invention.

DETAILED EMBODIMENTS

Figure 1A:
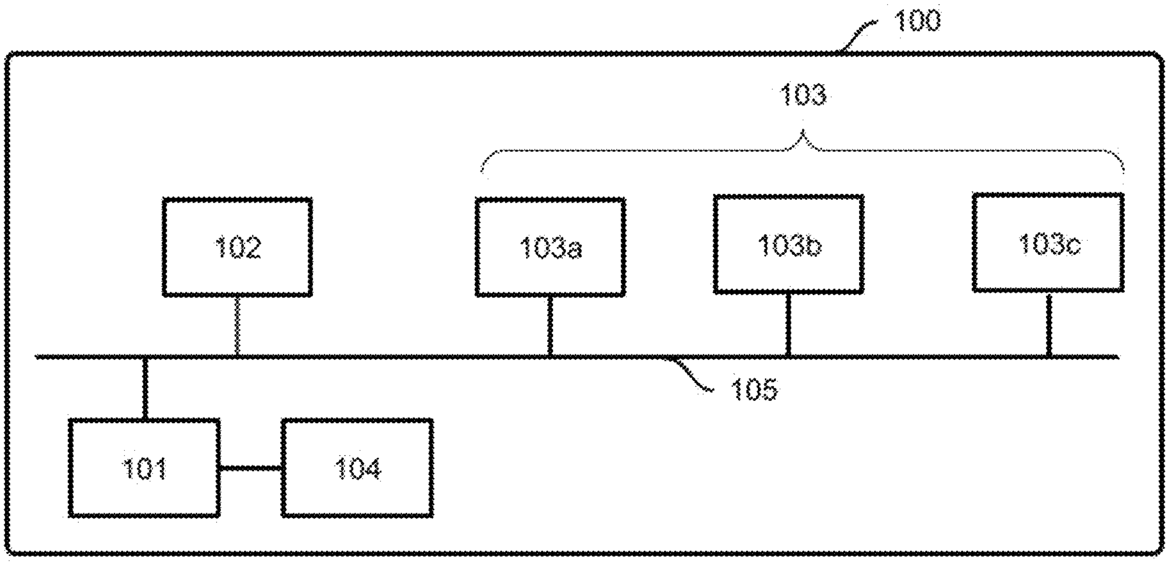
FIG. 1A illustrates a network device according to the embodiments of the present invention.

The terminology used herein is for the purpose of describing particular embodiments only and is not intended to be limited to example embodiments of the invention. As used herein, the singular forms "a", "an", and "the" are intended to include the plural forms as well, unless the context clearly indicates otherwise. As used herein, the terms "and/or" and "at least one of" include any and all combinations of one or more of the associated listed items. Expressions such as "at least one of," when preceding a list of elements, modify the entire list of elements and do not modify the individual elements of the list. The terms "comprises", "comprising", "includes" and "including", when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

While processes, steps, methods, algorithms, or the like described herein may be described in sequential order, such processes, steps, methods, and algorithms may be configured to work in alternate orders. In other words, any sequence or order of steps that may be described herein does not, in and of itself, indicate a requirement that the steps be performed in that order. The steps of the described processes may be performed in any order practical.

When an element is referred to as being "on", "connected to", "coupled to", or "adjacent to" another element, the element may be directly connected or linked to another element. However, it should be understood that still another element may be present in the middle. On the other hand, when an element is referred to as being "directly connected" or "directly linked" to other elements, it should be understood that there is no other component in the middle.

As used herein, the terms "non-transitory computer-readable storage media", "computer-readable medium", "main memory", "secondary storage medium", or "other storage medium" refers to any medium that participates in providing instructions to a processing unit for execution. The processing unit reads the data written in the primary storage medium and writes the data in the secondary storage medium. Therefore, even if the data written in the primary storage medium is lost due to a momentary power failure and the like, the data can be restored by transferring the data held in the secondary storage medium to the primary storage medium. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile storage includes dynamic memory. Transmission media includes coaxial cables, copper wire, and fiber optics. Transmission media can also take the form of acoustic or light waves, such as those generated during radio-wave and infrared data communications.

A volatile storage may be used for storing temporary variables or other intermediate information during the execution of instructions by a processing unit. A non-volatile storage or static storage may be used for storing static information and instructions for the processor, as well as various system configuration parameters.

The storage medium may include a number of software modules that may be implemented as software codes to be executed by the processing unit using any suitable computer instruction type. The software code may be stored as a series of instructions or commands, or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information A processing unit executes program instructions or code segments for implementing embodiments of the present invention. Furthermore, embodiments may be implemented by hardware, software, firmware, middleware, microcode, hardware description languages, or any combination thereof. When the embodiments are to be implemented by software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA) and other networks. The terms "network" and "system" are often used interchangeably. A CDMA network may implement radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement radio technology such as Global System for Mobile Communications (GSM). An OFDMA network may implement radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of the Universal Mobile Telecommunication System (UMTS). 3GPP Long Term Evolution (LTE) is a UMTS that uses E-UTRA, which employs OFDMA on the downlink and SC-FDMA on the uplink. UTRA, E-UTRA, UMTS, LTE, 5G and GSM are described in documents from an organization named "3rd Generation Partnership Project" (3GPP). CDMA 2000 and UMB are described in documents from an organization named "3rd Generation Partnership Project 2" (3GPP2).

As used herein, a "tunnel" is a communication channel between two network devices that transmits data by encapsulating the data's Internet Protocol (IP) packets according to any suitable cryptographic tunneling protocol. A network device can be any electronic device, client, server, peer, service, application, or other object capable of sending, receiving, or forwarding information over communications channels in a network. Cryptographic tunneling protocols may include without limitation, Internet Protocol security (IPsec), Secure Socket Layer/Transport Layer Security (SSL/TLS), Datagram Transport Layer Security (DTLS), Microsoft Point-to-Point Encryption (MPPE), and Secure Shell (SSH).

FIG. 1A illustrates a network device according to the embodiments of the present invention. Network device 100 comprises processing unit 101, secondary storage device 102, a plurality of network interfaces 103 (such as network interface 103*a*, 103*b*, and 103*c*), and memory 104. Processing unit 101 may connect directly with memory 104, and may connect with secondary storage 102 and plurality of network interfaces 103 through bus 105.

According to the embodiments of the present invention, there are myriad possibilities for network device 100. Network device 100 may be a router or a gateway implemented by software or hardware. If implemented by hardware, network device 100 may have a chassis box. In that case, network interfaces 103*a*, 103*b*, and 103*c*, processing unit 101, and secondary storage 102 are soldered on a circuit board inside the chassis box.

In one variant, network device 100 may further comprise at least one wireless communication module and at least one antenna. The at least one antenna may further be connected to, coupled to, or housed within network device 100 to transmit and receive electrical signals to and from the base station or any other electronic device, such that network device 100 is capable of utilizing the antenna to communicate wirelessly.

Figure 1B:
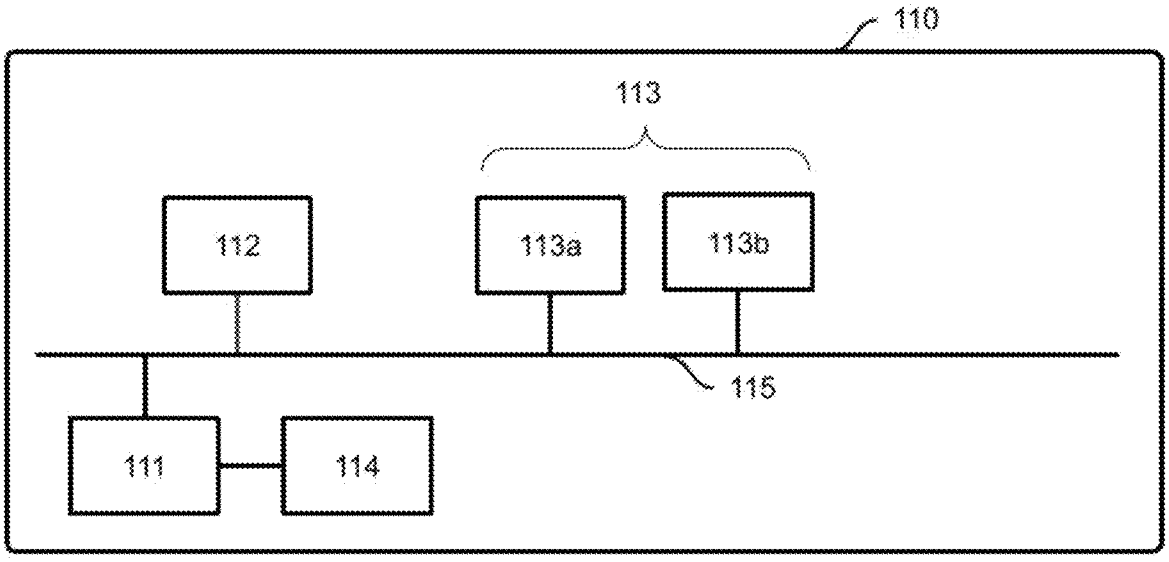
FIG. 1B illustrates a first node according to the embodiments of the present invention.

FIG. 1B illustrates a first node according to the embodiments of the present invention. First node 110 comprises processing unit 111, secondary storage device 112, a plurality of network interface 113 (such as network interface 113*a* and 113*b*), and memory 114. Processing unit 111 may connect directly with memory 114, and may connect with secondary storage device 112 and a plurality of network interface 113 through bus 115.

Figure 1C:
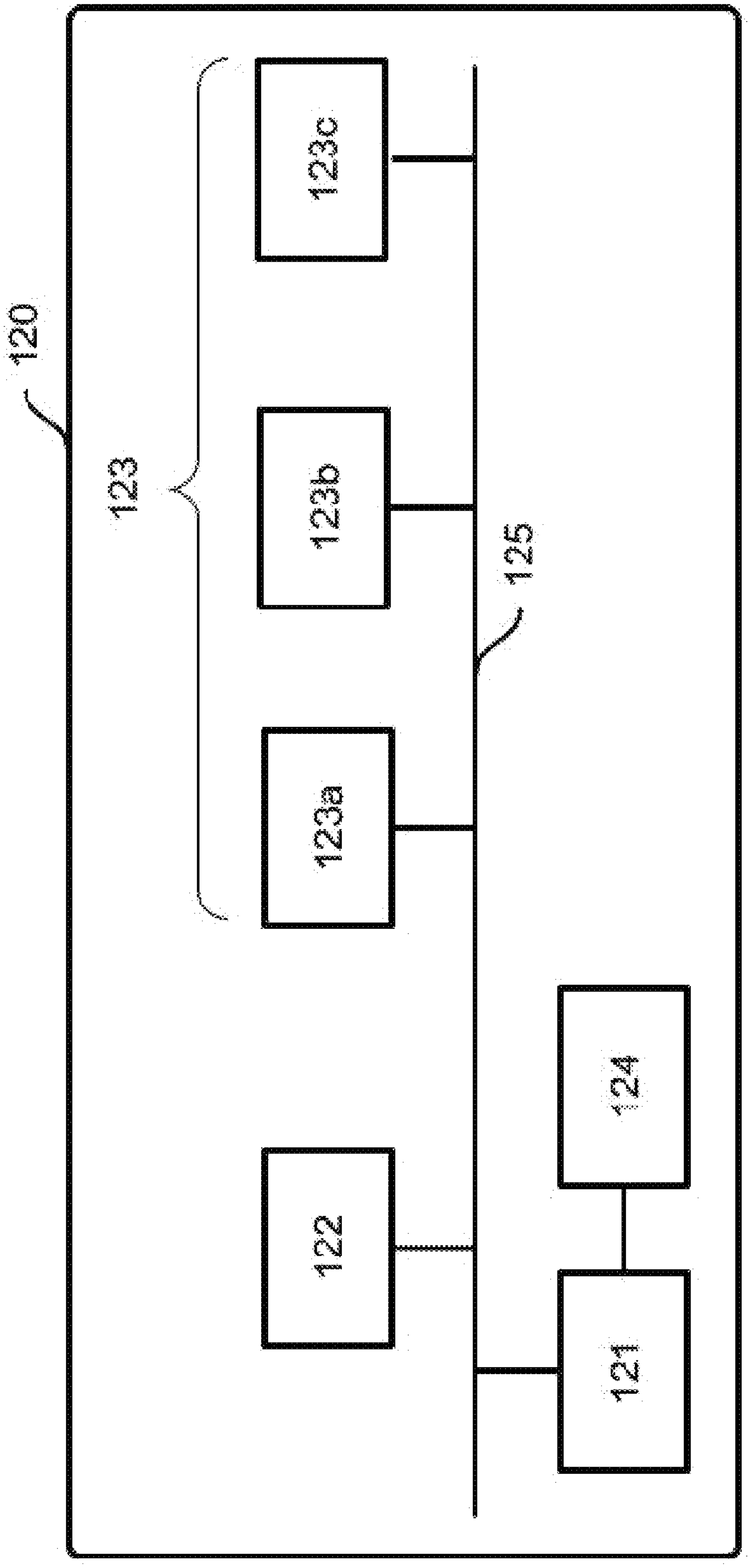
FIG. 1C illustrates a second node according to the embodiments of the present invention.

According to the embodiments of the present invention, there are myriad possibilities for first node 110. First node 110 may be an edged device (for example, a desktop, a mainframe, or a server) that sends or receives data packets. Alternatively, it may be an intermediate device (for example, a router or a gateway) that helps route data packets in the network such that one or more connections may be established through the access network FIG. 1C illustrates a second node according to the embodiments of the present invention. Second node 120 comprises processing unit 121, secondary storage device 122, a plurality of network interfaces 123 (such as network interface 123*a*, 123*b*, and 123*c*), and memory 124. Processing unit 121 may connect directly with memory 124, and may connect with secondary storage device 122 and the plurality of network interfaces 123 through bus 125.

In another variant, each of the plurality of network interfaces 103, 113, and 123 may be a ethernet port, Universal Serial Bus (USB) port, a power outlet, a terminal block, a Subscriber Identity Module (SIM) card slot, a wireless local area network (WLAN) antenna, and a serial console.

According to the embodiments of the present invention, there are myriad possibilities for second node 120. Second node 120 may be an edged device (for example, a desktop or a server) or an intermediate device (for example, a router or a gateway) for transmitting the data packets to the edged device such that one or more connections may be established through the access network. For example, second node 120 may be a LEO router located in aerospace if the access network is connected to the LEO satellite network.

Network device 100, first node 110, and second node 120 may be an exemplary embodiment of any network device, first node and second node described herein. Variation may be applied for network device 100, first node 110, and second node 120, such as the number of network interfaces composed of. The number of network interfaces illustrated above is for explanatory purposes only.

Figure 2A:
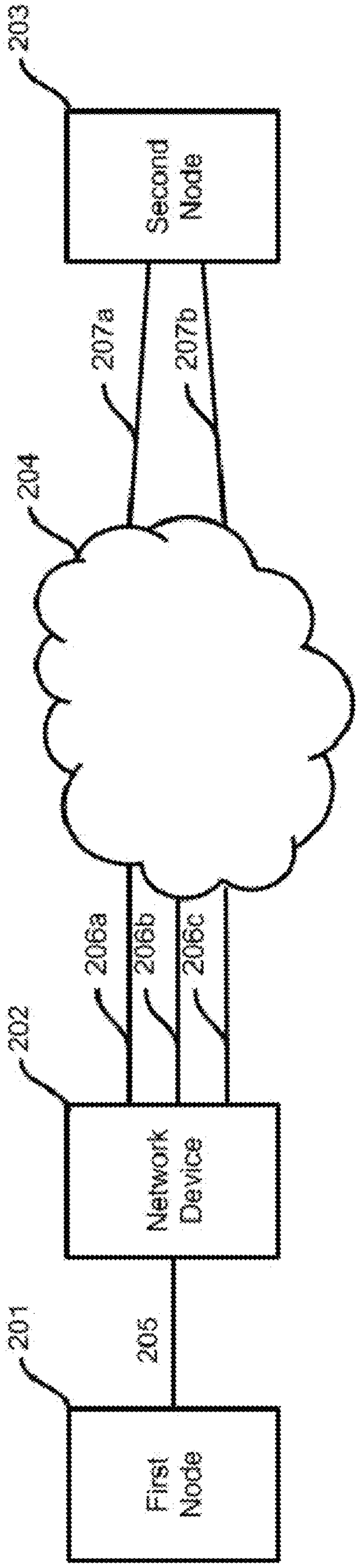
FIG. 2A is a block diagram representing the network environment according to one of the embodiments of the present invention.

FIG. 2A is a block diagram representing the network environment according to one of the embodiments of the present invention. The network environment includes network device 202, which connects to at least one local device (such as first node 201) within a local area network (LAN) through a first connection (such as connection 205) and further connects to second node 203 via interconnected networks 204. The first connection may be a wired or wireless connection within the LAN with one of the following topologies: point-to-point, bus, star, ring, mesh, or tree.

For illustrative purposes, network device 202 may comprise three network interfaces capable of connecting to access networks 206*a-c*, and second node 203 may comprise two network interfaces capable of connecting to access networks 207*a-b*. Access networks 206*a-c* and 207*a-b* are the access networks for providing wired or wireless access to interconnected networks 204, and network device 202 may further establish connection(s) with second node 203 through access networks 206*a*-206*c* and 207*a*-207*b*, which will be discussed in FIG. 3A and FIG. 3B.

Figure 2B:
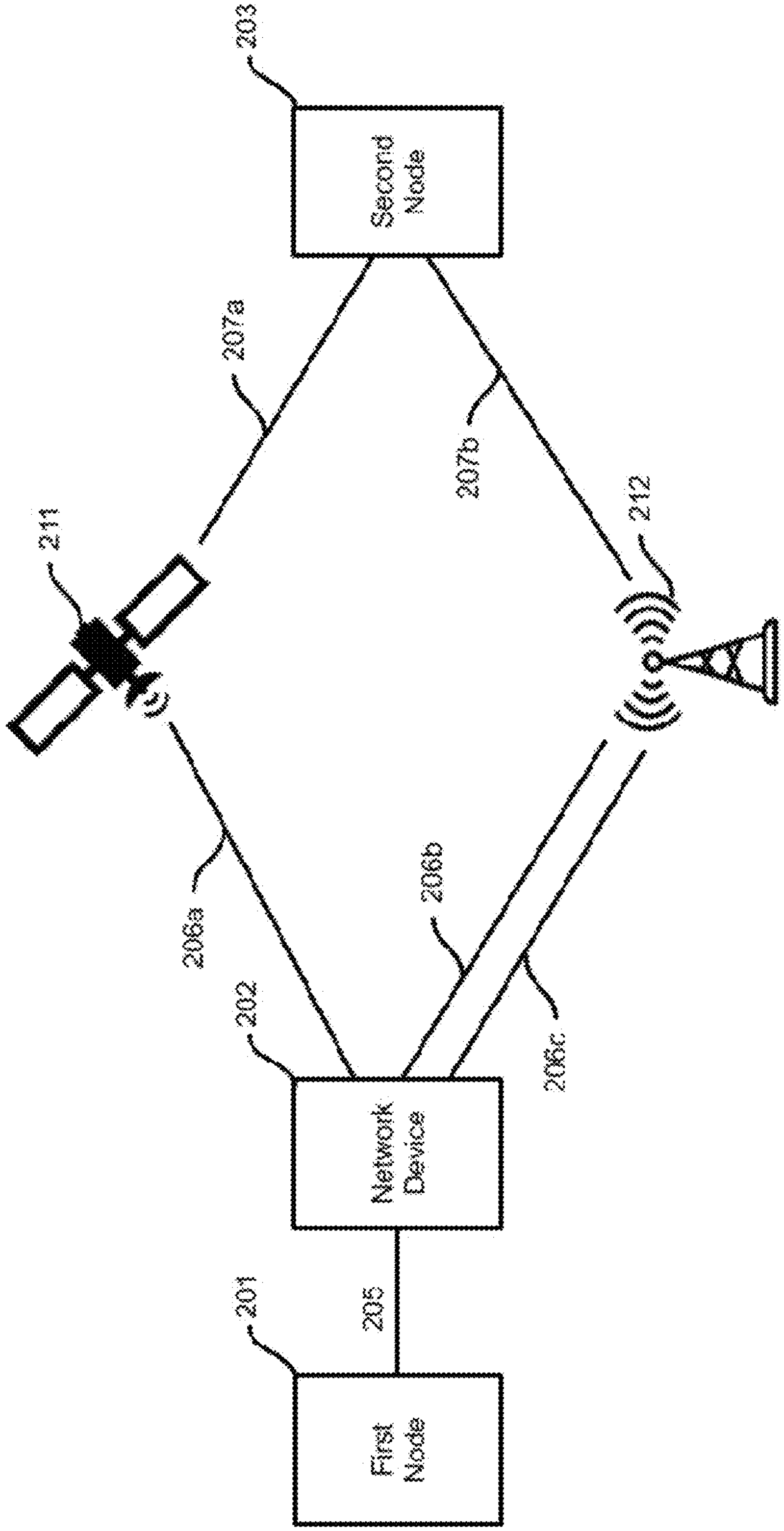
FIG. 2B is a block diagram representing the network environment in detail according to one of the embodiments of the present invention.

FIG. 2B is a block diagram representing the network environment in detail according to one of the embodiments of the present invention. The access network illustrated in FIG. 2A may establish connections through one or more channels in the interconnected networks. For example, a connection may be established through access networks 206*a* and 207*a* that are capable of accessing a satellite, such as satellite 211, and another two connections may be established through access networks 206*b*, 206*c*, and 207*b* that are capable of accessing a base station provided by an internet service provider.

The connection and the access network illustrated in FIG. 2B are for illustrative purposes only. There is no limitation on the type of the access network or the combination of the access networks and the connections. Access networks 206*a* and 207*a* may be any access network including a satellite-accessible access network, and access networks 206*b*, 206*c*, and 207*b* may be any access network including a base station-accessible access network.

Figure 3A:
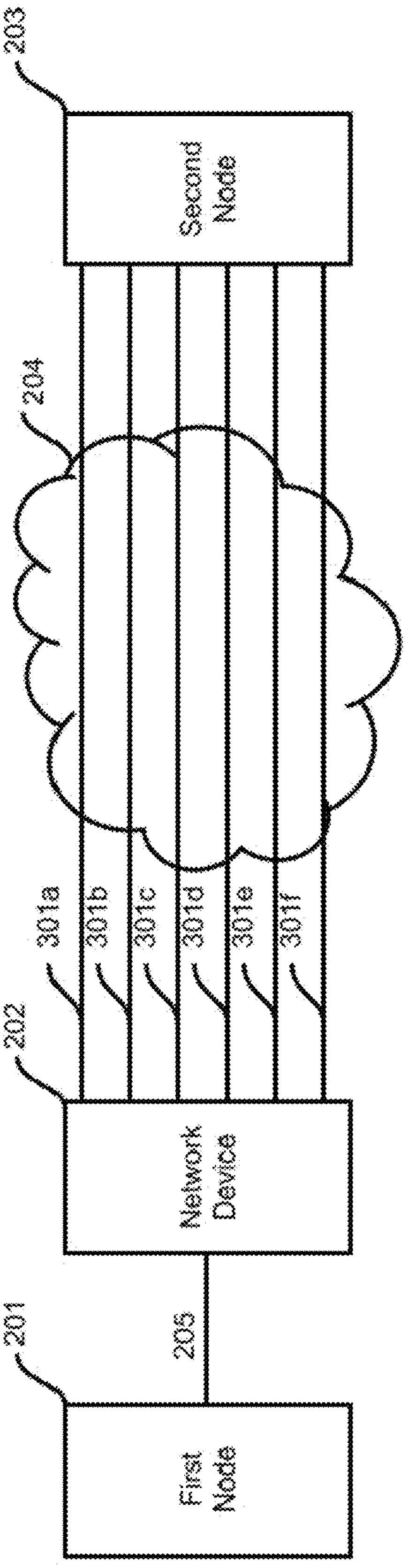
FIG. 3A and FIG. 3B are block diagrams representing the network environment according to another embodiment of the present invention.
Figure 3B:
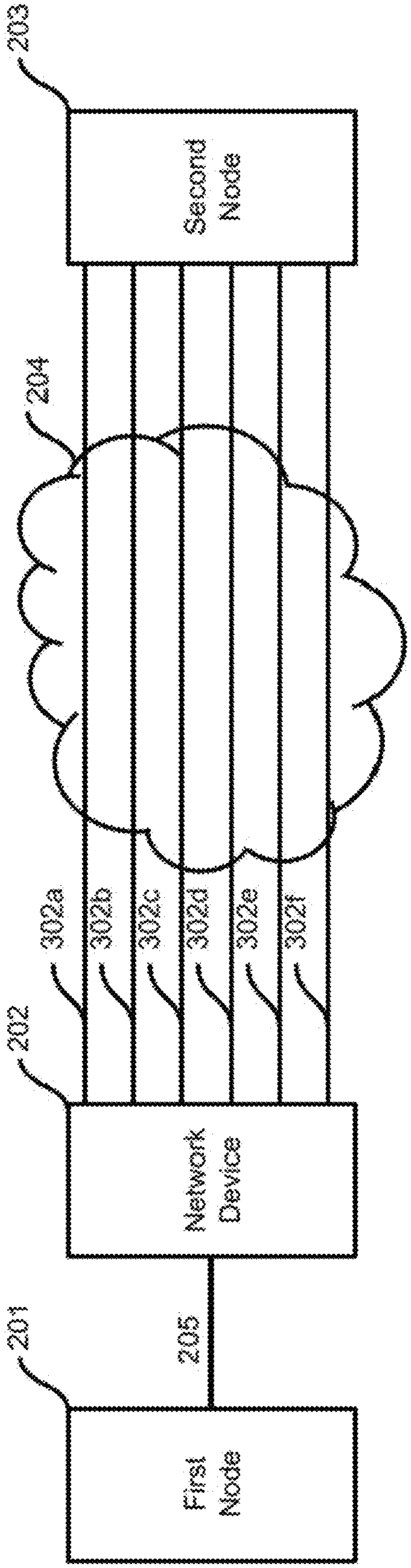

FIG. 3A and FIG. 3B are the block diagrams representing the network environment according to another embodiment of the present invention. A plurality of second connections (such as connections 301*a*-301*f* illustrated in FIG. 3A) and a plurality of third connections (such as connections 302*a*-302*f* illustrated in FIG. 3B) may be established between network device 202 and second node 203 through the access networks (such as access networks 206*a*-206*c* and 207*a*-207*b* illustrated in FIG. 2A).

In one variant, each of connections 301*a*-301*f* established between network device 202 and second node 203 may be a session-based connection. If each connection of connections 301*a*-301*f* illustrated in FIG. 3A is session-based, then each connection of connections 302*a*-302*f* illustrated in FIG. 3B is also session-based.

According to the embodiments of the present invention, network device 202 may transmit data packets to second node 203 through connections 301*a*-301*f*, and connections 301*a*-301*f* may be disconnected and replaced by connections 302*a*-302*f* conditionally. Network device 202 may determine an outbound traffic policy to be applied, which in turn determines the connection(s) among the plurality of connections to be used for transmitting the data packets. Accordingly, network device 202 may transmit data packets to second node 203 through connection(s) among 301*a*-301*f* according to a first outbound traffic policy, and may transmit data packets to second node 203 through connection(s) among connections 302*a*-302*f* according to a second outbound traffic policy.

Each of the first outbound traffic policy and the second outbound traffic policy mentioned in the present invention may be the same or different, as selected from a plurality of outbound traffic policies stored in the secondary storage of network device 202. Details about the outbound traffic policy will be discussed next.

FIG. 4 is a table illustrating conditions considered for different outbound traffic policies that may be applied to the network device according to the embodiments of the present invention.

As illustrated in FIG. 4, there are five outbound traffic policies that may be applied to network device 202, namely "Policy A", "Policy B", "Policy C", "Policy D", and "Policy E". Each of them is bounded by the conditions shown in row 401-404, with respect to parameters such as data type (row 401), source device (row 402), destination device (row 403), and encryption (row 404). There is no limitation on the conditions that may be considered for the outbound traffic policies: other than those shown in row 401-404, any parameter related to data packet transmission may also be applied as a condition, such as the protocol, source port number, destination port number, source address, and destination address. Row 405 represents the priority of each policy and row 406 reflects which connection(s) shall be used to transmit the data packets with reference to an outbound traffic policy. The outbound traffic policy selected for connections 301a-301f and connections 302a-302f are respectively referred to as the "first outbound traffic policy" and the "second outbound traffic policy".

In one embodiment, if all conditions of an outbound traffic policy are satisfied, network device 202 may select to apply that outbound traffic policy. For example, "N/A" in the table at FIG. 4 indicates that no condition is set for data type, source device, destination device, and encryption. Accordingly, Policy A may be applied as the first outbound traffic policy at the beginning of the data packet transmission because all conditions under Policy A are satisfied.

In another embodiment, if there are more than one outbound traffic policies with which all conditions are satisfied, network device 202 may select to apply one of them. For example, if the data packets are encrypted by symmetric algorithm AES-256 and from first node 201 to second node 203, then Policy A, Policy B, and Policy D have all conditions satisfied and each of them may be selected. When there are more than one outbound traffic policies with which all the conditions are satisfied, then the priority in row 405 may further be used to determine the outbound traffic policy to be applied.

In one variant, a default outbound traffic policy may be applied before the selection of the first outbound traffic policy. A benefit of introducing the default outbound traffic policy is to make sure that network device 202 may still make use of the default outbound traffic policy again for data packet transmission even if none of the remaining outbound traffic policy can be applied.

In another variant, the first outbound traffic policy is determined by network device 202 to replace the default outbound traffic policy after a first time threshold.

Figure 5A:
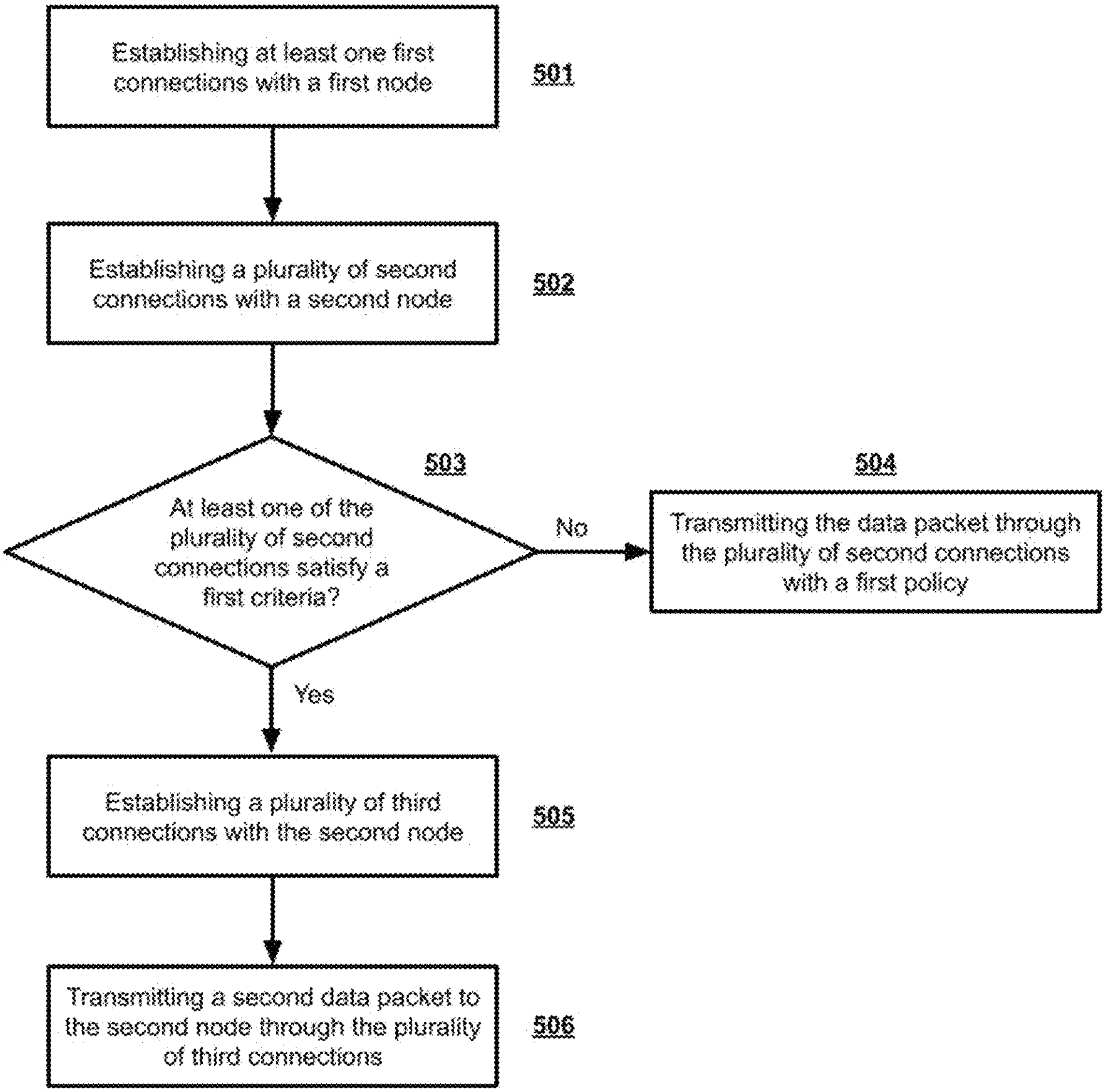
FIG. 5A illustrates a method for enhancing the performance of data packet transmission at the network device.

FIG. 5A illustrates a method for enhancing the performance of data packet transmission at the network device. Although the embodiments of the present invention are applicable for both the plurality of connections and the aggregated connection established between network device 202 and second node 203, such that network device 202 may transmit the data packets received from first node 201 to second node 203, only the plurality of connections is described below for illustration purposes.

In process 501, network device 202 may establish at least one first connection with first node 201, and a first congestion control algorithm is applied for each of the at least one first connection. For example, network device 202 may establish connection 205, and the first congestion control algorithm is applied to control the transmission rate of data packet transmission in connection 205.

There is no limitation on the choice of the first congestion control algorithm, the first congestion control algorithm may be any algorithm that is suitable for controlling the rate of the data packet transmission, such as Turbo-Start, cubic, fast recovery, slow start, congestion avoidance, and Bottleneck Bandwidth and Round-trip time (BBR).

In process 502, network device 202 may establish the plurality of second connections (such as connections 301a-301f) with second node 203, and apply the first congestion control algorithm for each of the plurality of second connections to perform congestion control. After establishing at least one first connection and the plurality of second connections, when receiving data packets from first node 201, network device 202 may transmit the data packets to second node 203 through the plurality of second connections according to the first outbound traffic policy.

In one embodiment, the first outbound traffic policy is selected by the user or the administrator of network device 202.

In another embodiment, the first outbound traffic policy is selected according to the previous data packet transmission behavior.

In one variant, network device 202 may segment the data packets into at least one segment, and transmit the at least one segment to second node 203 through the plurality of second connections according to the first outbound traffic policy. Network device 202 may then determine the outbound traffic policy to be applied according to conditions of the at least one segment.

The first time threshold is configurable and may be varied according to the user preference and the congestion control algorithm being applied. For example, the first time threshold may be 3 seconds or 5 seconds after the data packet is transmitted.

In process 503, network device 202 may determine whether a first criteria is satisfied, which is dependent on the performance between the at least one first connection and the plurality of second connections evaluated based on one or more of the following: latency, type of connection, throughput, and round trip time. There is no limitation on how the determination of the first criteria is performed: the determination of the first criteria may be performed by comparing the data stored in the non-transitory computer-readable storage medium of network device 202, or by comparing the configuration associated with the user or administrator.

In one variant, the first criteria relates to the performance of the plurality of second connections only, so the performance of the at least one first connection is excluded in the consideration of the determination.

In one example, the first criteria is latency-dependent. The first criteria may be satisfied if the latency of at least one of the plurality of second connections reaches 400 ms, or the average latency of the plurality of second connections reaches 300 ms.

In another example, if the overall latency of the plurality of second connections is larger than then the overall latency of the at least one first connection, the first criteria is satisfied.

In one variant, network device 202 may perform process 503 periodically. For example, the determination may be performed every 200 ms.

In another embodiment, the first criteria may depend on the type of the outbound connection. For example, the first criteria may be satisfied if the at least one of the plurality of second connections is an LEO connection. There are myriad methods for network device 202 to determine the type of the at least one of the plurality of second connections, such as referring to the latency and the configuration of the outbound connection.

In another embodiment, the first criteria may be enforced. For example, the first criteria is satisfied when network device 202 receives an instruction from the user or the administrator. The user or the administrator may provide the instruction through the interface of network device 202, such as a graphical user interface or a command line console.

In one variant, when considering more than one first criteria, network device 202 may consider the priority of the first criteria, which may be assigned by any means, such as by default or by the user or the administrator of network device 202.

If the first criteria is not satisfied, in process 504, network device 202 may continue to transmit the data packets received from first node 201 to second node 203 through the plurality of second connections.

If the first criteria is satisfied, in process 505, network device 202 may establish a plurality of third connections with second node 203. The number of the plurality of third connections established is the same or less than the number of the plurality of second connections.

In one example, suppose six connections 301*a*-301*f* are established as the plurality of second connections; in that case, network device 202 may establish six connections as the plurality of third connections, such as connections 302*a*-302*f*.

In another example, network device 202 may establish four connections 302*a*-302*d* as the plurality of third connections, although six connections 301*a*-301*f* were established as the plurality of second connections.

In process 506, network device 202 may transmit a modified data packet to second node 203 through the plurality of third connections, and a second congestion control algorithm applies for congestion control of each of the plurality of third connections. The modified data packet is a data packet corresponding to a data packet of the data packets received from first node 201, which will be further discussed later.

In another variant, network device 202 may transmit the modified data packet to second node 203 when receiving two or more data packets from first node 201. The payload of the modified data packet may comprise two or more data packets.

According to the embodiments of the present invention, the second congestion control algorithm applied to the plurality of third connection may be any algorithm that is suitable for controlling the rate of the data packet transmission, such as Turbo-Start, cubic, fast recovery, slow start, congestion avoidance, and BBR. However, the second congestion control algorithm is an algorithm that differs from the first congestion control algorithm, and may be selected according to the network performance of the plurality of second connections like fairness, throughput, packet loss, round-trip time (RTT), and available bandwidth for each connection.

In one variant, network device 202 may select the second congestion control algorithm based on the approach, such as window-based, loss-based, delay-based, and queue-based. For example, if a window-based approach algorithm is required, Cubic or Data Center TCP may be selected as the second congestion control algorithm.

For further example, if the plurality of second connections experienced high packet loss, a more conservative algorithm with smaller initial congestion window (ICW) might be selected and applied to the plurality of third connections to avoid congestion worsening. Conversely, if the plurality of second connections are with low RTT and high bandwidth, a more aggressive algorithm with larger ICW might be selected and applied to the plurality of third connections to avoid congestion worsening.

By adapting the congestion control algorithm based on real-time network performance, network device 202 may improve data transfer efficiency for each connection established between network device 202 and second node 203. By applying different congestion control algorithms for the plurality of second connections and the plurality of third connection, the overall congestion control may be improved.

In one variant, network device 202 may further disconnect all or part of the plurality of second connections, which may be performed before, after, or concurrently with process 506.

In another variant, optionally, after a period of time, network device 202 may further determine whether at least one of the plurality of third connections satisfies a second criteria. If the second criteria is satisfied, network device 202 may establish the plurality of fourth connections and transmit the second data packet to the second node through plurality of fourth connections.

In one embodiment, the period of time may be configured by the user or the administrator of network device 202.

In another embodiment, the period of time may be configured automatically by network device 202.

In one variant, the plurality of fourth connections is the same as the plurality of second connections.

Switching between connections may involve terminating one and initiating another. This can cause the source or destination addresses of the data packets to differ. Consequently, for example, the data packets transmitted through the plurality of third connections may be different from the source IP address of the data packets transmitted through the at least one second connection, and the data packets may thereby be transmitted incorrectly following the outbound traffic policies applied. To ensure proper routing under the outbound traffic policies, network device 202 will perform additional processes, which will be discussed below.

In one variant, network device 202 may further aggregate at least one of connections 301*a*-301*f* as at least one first aggregated connection, such as aggregated connection 303. Details for the aggregated connection will be discussed later.

Figure 5B:
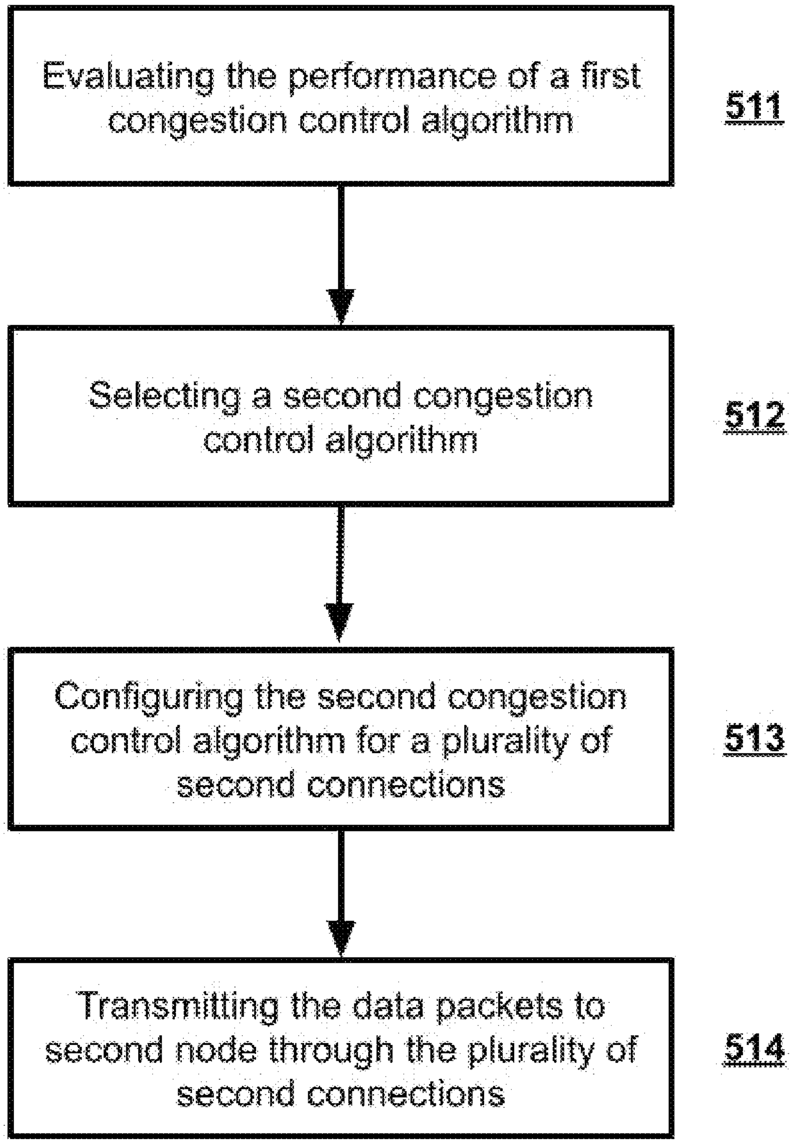
FIG. 5B illustrates another method for enhancing the performance of data packet transmission at the network device.

FIG. 5B illustrates a method for enhancing the performance of data packet transmission at the network device. In some situations, network device 202 may change the congestion control algorithm without disconnecting the plurality of second connections. For example, if the congestion control algorithms are implemented in the network device's operating system or application layer, it is possible to change the congestion control algorithm without disconnecting the plurality of second connections.

In process 511, network device 202 may evaluate the performance of the first congestion control algorithm based on predefined metrics and thresholds. The predefined metrics and thresholds may be based on one or more of the following: fairness, throughput, packet loss, round-trip time (RTT), and available bandwidth for each connection.

In process 512, network device 202 may select a suitable alternative congestion control algorithm as the second congestion control algorithm.

In process 513, network device 202 may configure the second congestion control algorithm for the plurality of second connections.

In process 514, when receiving data packets from first node 201, network device 202 may transmit the data packets to second node 203 through the plurality of second connections according to the second outbound traffic policy.

Figure 6:
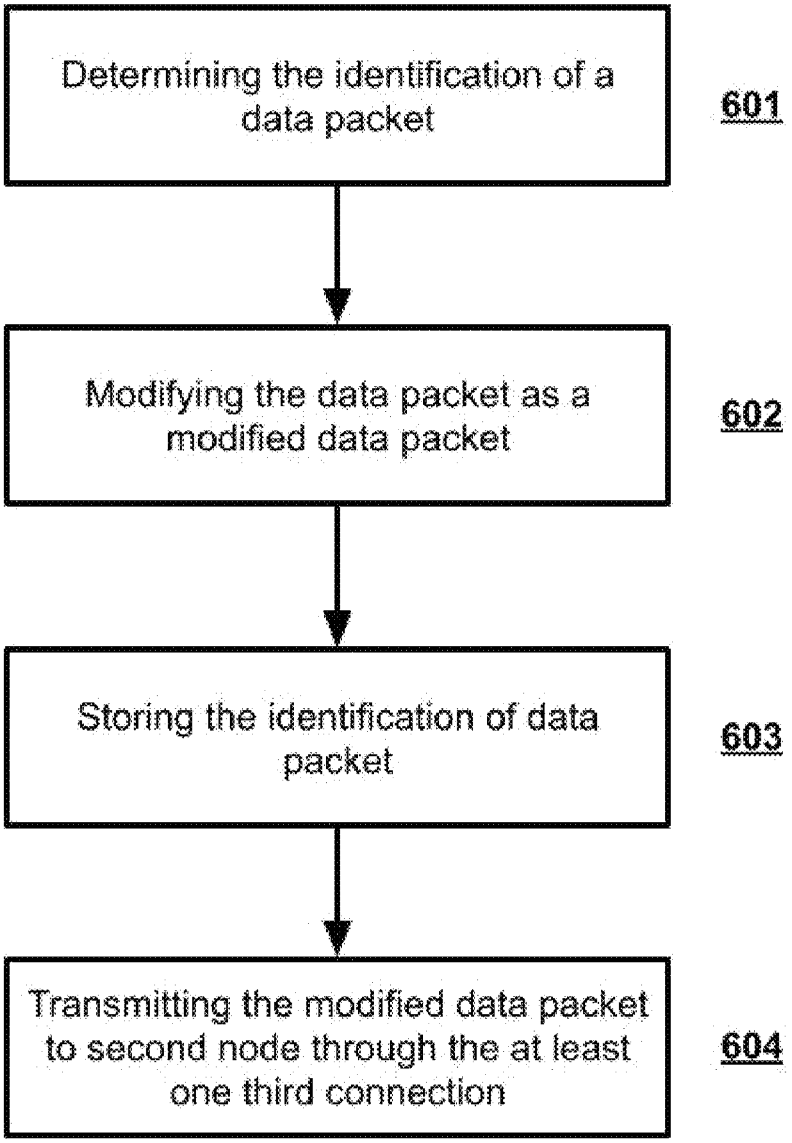
FIG. 6 illustrates another method for enhancing the performance of data packet transmission at the network device.

FIG. 6 illustrates another method for processing data packets during transmission at the network device, focusing on the steps between processes 505 and 506. In process 601, when receiving the data packet from first node 201, network device 202 may determine the identification of the data packet. The identification may include but is not limited to one or more of the following: source IP address, destination IP address, MAC address, protocol, flow ID, application type, or any other data used for outbound policy determination. If the plurality of third connections is required to receive or transmit the data packet segment according to the identification, process 602 may be performed.

In process 602, network device 202 may modify the data packet as a modified data packet. The modification may be performed by either modifying the header of the data packet, or encapsulating the data packet such that the header of the modified data packet is different from the identification of the data packet.

In one preferred embodiment, the source address of the modified data packet is a preserved IP address.

In one example, when receiving a data packet transmitted from first node 201 to second node 203, network device 202 may replace the source address of the data packet (being the IP address or the MAC address of first node 201) with the IP address or the MAC address of network device 202 to form part of the modified data packet.

In another example, when receiving a data packet transmitted from second node 203 to first node 201, network device 202 may replace the destination IP address of the data packet (being the IP address or the MAC address of second node 203) with the IP address or the MAC address of network device 202 to form part of the modified data packet.

In one variant, if the plurality of third connections are aggregated together as at least one second aggregated connection, network device 202 may determine a connection within the at least one second aggregated connection to be used for transmitting the modified data packet. The connection may be selected based on the routing table and/or the outbound traffic policy. Network device 202 may further encapsulate the modified data packet and transmit the encapsulated modified data packet to the destination device. The routing table might include information about the available connections between network device 202 and second node 203, potentially including real-time metrics like bandwidth availability and latency.

In one variant, network device 202 may modify the header of the modified data packet instead of performing encapsulation on the modified data packet.

In process 603, network device 202 may store the identification of the data packet as a value and store it in the header or the payload of the modified data packet.

In one embodiment, the value is stored in the socket buffer (SKB) structure used by the Linux kernel for packet tracking. A benefit is that SKB efficiently manages network traffic with data packets of varying sizes and types.

In one variant, tunnel information may further be stored in the header or the payload of the modified data packet.

In another variant, apart from the Network Address Translation (NAT), network device 202 may also perform Port Address Translation (PAT). PAT allows sharing a single public IP address for multiple devices on a network but differentiates them by assigning unique port numbers in packet headers.

In process 604, network device 202 may transmit the modified data packet to second node 203 through the plurality of third connections.

In one variant, network device 202 may transmit the encapsulated modified data packet to second node 203 through the plurality of third connections.

Those skilled in the arts would appreciate that there are myriad ways to aggregate, combine, or bond the plurality of first connections to form one aggregated connection. An aggregated connection is perceived as one connection by sessions or applications that are using it, which can be perceived as a tunnel, a virtual private network (VPN) connection, or a connectionless-oriented connection. For example, the aggregated connection may be a TCP or a User Datagram Protocol (UDP) connection. In some cases, the aggregated connection is an aggregation of a plurality of first connection, and each of the plurality of first connection is established between network device 202 and second node 203.

The method disclosed in the present invention may also be applicable for the aggregated connection, such as at least one first aggregated connection and at least one second aggregated connection established by aggregating connection 301*a*-301*f* and connection 302*a*-302*f* in different means. If the at least one first aggregated connection are established, then the same number of the at least one second aggregated connection may be further established through connections 302*a*-302*f*.

In one variant, the number of the at least one second aggregated connection differs from the the number of the at least one first aggregated connection.

Figure 3C:
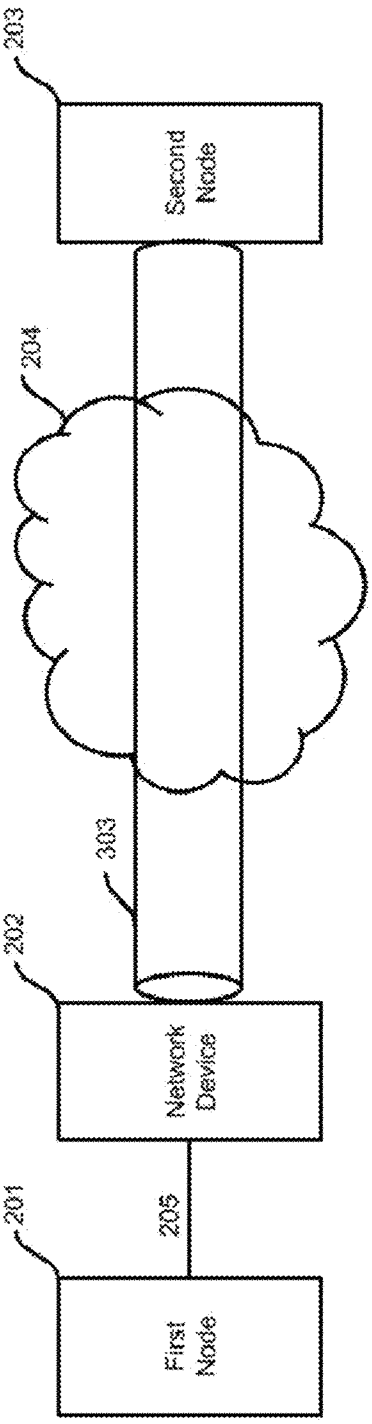
FIG. 3C and FIG. 3D are block diagrams representing the network environment according to another embodiment of the present invention.
Figure 3D:
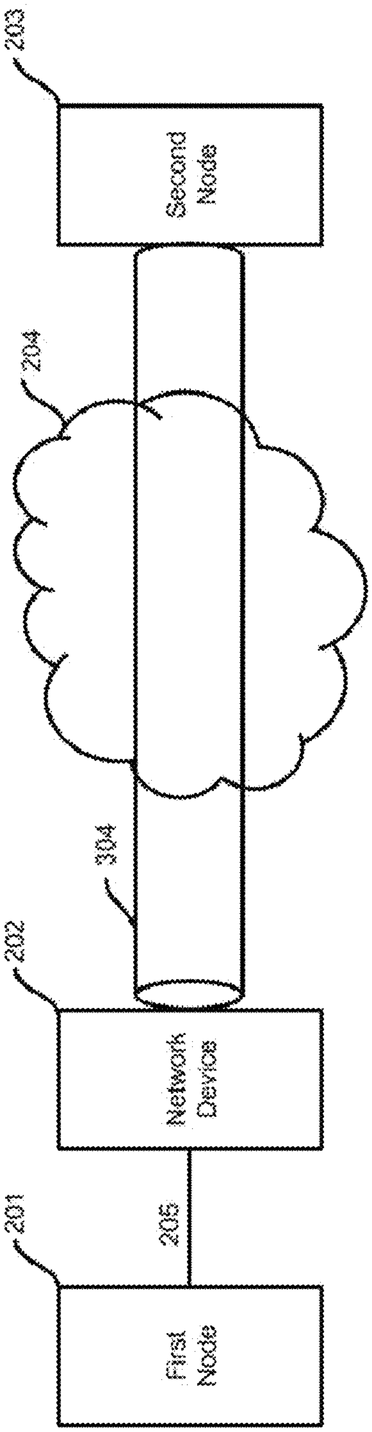

FIG. 3C-FIG. 3D are the block diagrams representing the network environment according to the embodiments of the present invention. In respect of the at least one of the plurality of second connections, one or more connections 301*a*-301*f* illustrated in FIG. 3A may be aggregated as at least one first aggregated connection.

In one example, as illustrated in FIG. 3C, an aggregated connection 303 is established as the at least one first aggregated connection by aggregating connection 301*a*-301*f*, and each of connections 301*a*-301*f* is established between network device 202 and second node 203. If connections 302*a*-302*f* are established thereafter, as illustrated in FIG. 3D, another aggregated connection 304 is established as the at least one second aggregated connection by aggregating connection 302*a*-302*f*, and each of connections 302*a*-302*f* is established between network device 202 and second node 203. Network device 202 may transmit data packets to second node 203 through aggregated connection 303 or aggregated connection 304.

Figure 3E:
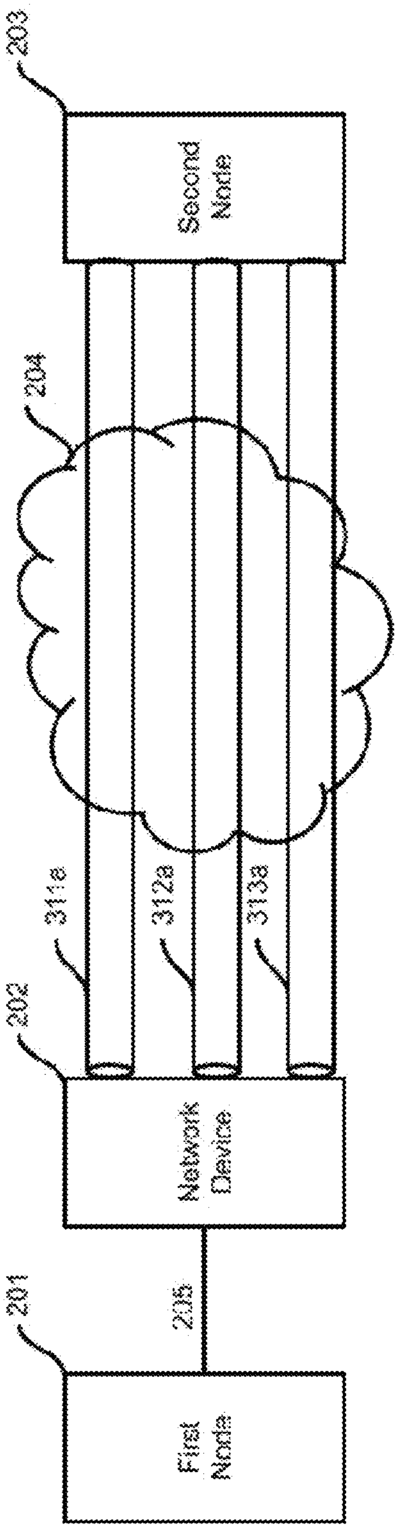
FIG. 3E and FIG. 3F are block diagrams representing the network environment according to another embodiment of the present invention.
Figure 3F:
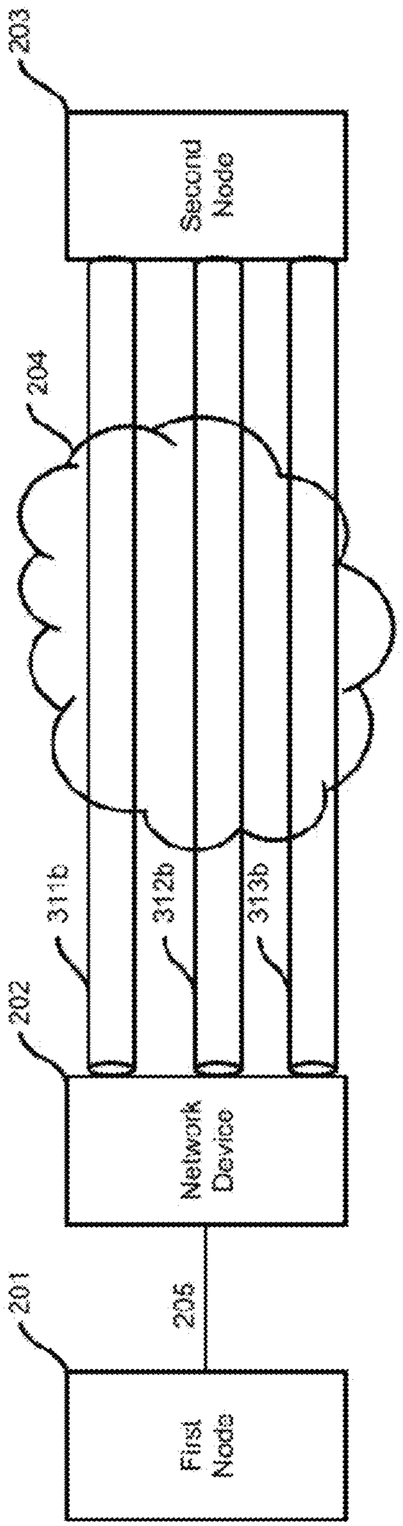

In another example, as illustrated in FIG. 3E, connections 301*a* and 301*b*, connections 301*c* and 301*d*, and connections 301*e* and 301*f* are aggregated as aggregated connections 311*a*, 312*a*, and 313*a* respectively, and each of connections 301*a*-301*f* is established between network device 202 and second node 203. If connections 302*a*-302*f* are established thereafter, as illustrated in FIG. 3F, aggregated connections 311*b*, 312*b*, and 313*b* are established by aggregating connections 302*a*-302*b*, connections 302*c*-302*d*, and connections 302*e*-302*f* respectively, and each of connection 302*a*-302*f* is established between network device 202 and second node 203. Network device 202 may transmit data packets to second node 203 through aggregated connections 311*a*-313*a* or aggregated connections 311*b*-313*b*.

In another example, an aggregated connection is established for each connection of connections 301*a*-301*f* established between network device 202 and second node 203, resulting in the establishment of six aggregated connections. If connections 302*a*-302*f* are established thereafter, another aggregated connection is established for each connection of connections 302*a*-302*f* established between network device 202 and second node 203, resulting in the establishment of another six aggregated connections.

The methods disclosed in the present inventions with respect to the plurality of second connections and the plurality of third connections is also applicable for the at least one first aggregated connection and the at least one second aggregated connection.

In one embodiment, the established aggregated connection is policy-based, all the matched data packets defined in local networks and remote networks will be routed to the established aggregated connection.

In another embodiment, the established aggregated connection is route-based, the data packet will be routed to the established aggregated connection according to the outbound traffic policy, which is similar to the outbound traffic policy applied to the connections.

The invention claimed is:

1. A method for performing congestion control at an apparatus, comprising:

a. establishing at least one first connection with a first node;

b. establishing a plurality of second connections with a second node;

c. transmitting data packets to the second node through at least one of the plurality of second connections according to a first outbound traffic policy when receiving the data packets from the first node through the at least one first connection;

d. if a first criteria is satisfied:

i. establishing a plurality of third connections with the second node to replace the plurality of second connections;

ii. modifying the data packets into modified data packets by modifying a source address of the data packets with a preserved Internet Protocol (IP) address when receiving the data packets from the first node through the at least one first connection; and iii. transmitting the modified data packets to the second node through at least one of the plurality of third connections according to a second outbound traffic policy;

wherein:

the at least one first connection and the plurality of second connections apply a first TCP congestion control algorithm;

the plurality of third connections applies a second TCP congestion control algorithm; and the plurality of third connections include a first number of connections not more than a second number of connections in the plurality of second connections.

2. The method of claim 1, further comprising:

e. disconnecting the plurality of second connections.

3. The method of claim 1, further comprising:

f. determining a third outbound traffic policy after a first time threshold to replace the first outbound traffic policy.

4. The method of claim 1, wherein the plurality of second connections are aggregated as a first aggregated connection.

5. The method of claim 1, wherein the plurality of third connections are aggregated as a second aggregated connection.

6. The method of claim 3, wherein the third outbound traffic policy is determined based on one or more of the following: protocol, source port number, destination port number, source address, and destination address.

7. The method of claim 1, wherein the second TCP congestion control algorithm is selected according to network performance of the plurality of second connections.

8. The method of claim 1, further comprising:

g. if a second criteria is satisfied, establishing a plurality of fourth connections with the second node.

9. The method of claim 8, further comprising:

h. transmitting the data packets to the second node through the plurality of fourth connections when receiving the data packets from the first node through the at least one first connection.

10. The method of claim 8, wherein the second criteria is determined after a period of time.

11. A system, comprising:

a first node, comprising:

a plurality of first network interfaces;

at least one first processing unit; and at least one first non-transitory computer-readable storage medium;

a second node, comprising:

a plurality of second network interfaces;

at least one second processing unit; and at least one second non-transitory computer-readable storage medium;

a network device, comprising:

a plurality of third network interfaces;

at least one third processing unit; and at least one third non-transitory computer-readable storage medium;

wherein the at least one third non-transitory computer-readable storage medium stores program instructions executable by the at least one third processing unit for:

a. establishing at least one first connection with a first node;

b. establishing a plurality of second connections with a second node;

c. transmitting data packets to the second node through at least one of the plurality of second connections according to a first outbound traffic policy when receiving the data packets from the first node through the at least one first connection;

d. if a first criterion is satisfied:

i. establishing a plurality of third connections with the second node to replace the plurality of second connections;

ii. modifying the data packets into modified data packets by modifying a source address of the data packets with a preserved Internet Protocol (IP) address when receiving the data packets from the first node through the at least one first connection; and iii. transmitting the modified data packets to the second node through at least one of the plurality of third connections according to a second outbound traffic policy;

wherein:

the at least one first connection and the plurality of second connections apply a first TCP congestion control algorithm;

the plurality of third connections apply a second TCP congestion control algorithm; and the plurality of third connections includes a first number of connections not more than a second number of connections in the plurality of second connections.

12. The system of claim 11, wherein the at least one third non-transitory computer-readable storage medium stores program instructions executable by the at least one processing unit for:

e. disconnecting the plurality of second connections.

13. The system of claim 11, wherein the at least one third non-transitory computer-readable storage medium stores program instructions executable by the at least one processing unit for:

f. determining a third outbound traffic policy after a first time threshold to replace the first outbound traffic policy.

14. The system of claim 11, wherein the plurality of second connections are aggregated as a first aggregated connection.

15. The system of claim 11, wherein the plurality of third connections are aggregated as a second aggregated connection.

16. The system of claim 13, wherein the third outbound traffic policy is based on one or more of the following: protocol, source port number, destination port number, source address, and destination address.

17. The system of claim 11, wherein the second TCP congestion control algorithm is selected according to the network performance of the plurality of second connections.

18. The system of claim 11, wherein the at least one third non-transitory computer-readable storage medium stores program instructions executable by the at least one processing unit for:

g. if a second criteria is satisfied, establishing a plurality of fourth connections with the second node.

19. The system of claim 18, wherein the at least one third non-transitory computer-readable storage medium stores program instructions executable by the at least one processing unit for:

h. transmitting the data packets to the second node through the plurality of fourth connections when receiving the data packets from the first node through the at least one first connection.

20. The system of claim 19, wherein the second criteria is determined after a period of time.

* * * * *